Oct. 16, 1923.
L. S. BENDER
ANIMAL TRAP
Filed Jan. 19, 1923
1,471,090
2 Sheets-Sheet 1
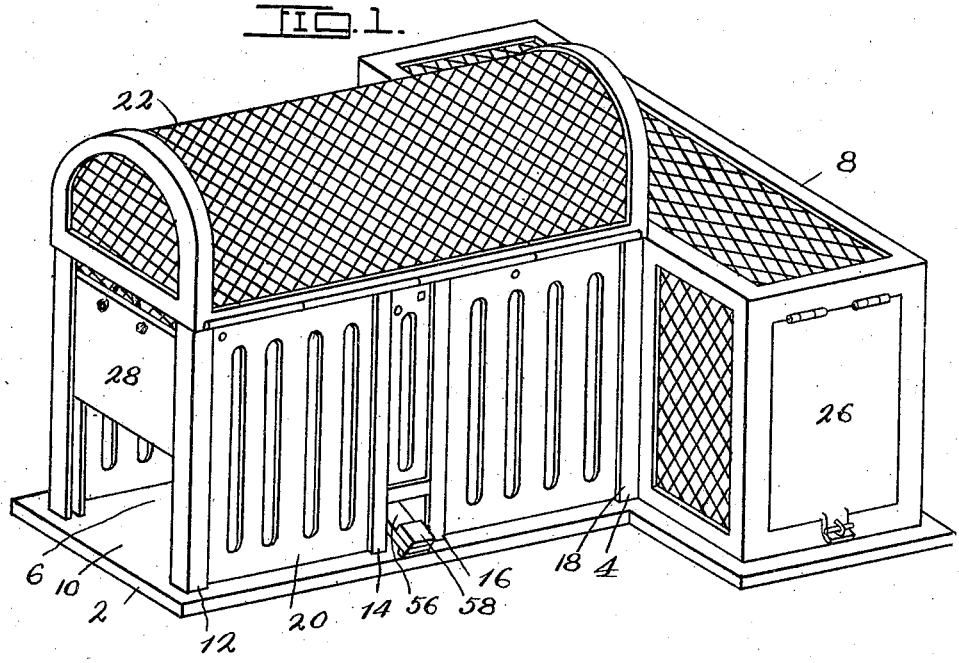
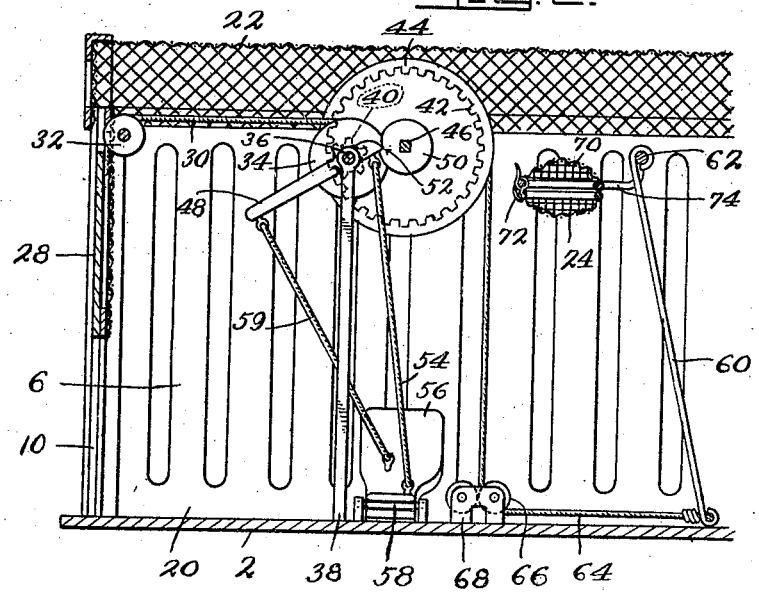
Witness:
Fred C. Fischer.
Inventor.
Lonnie S. Bender,
By F. G. Fischer,
Attorney.

Oct. 16, 1923.
L. S. BENDER
1,471,090
ANIMAL TRAP
Filed Jan. 19, 1923 2 Sheets-Sheet 2
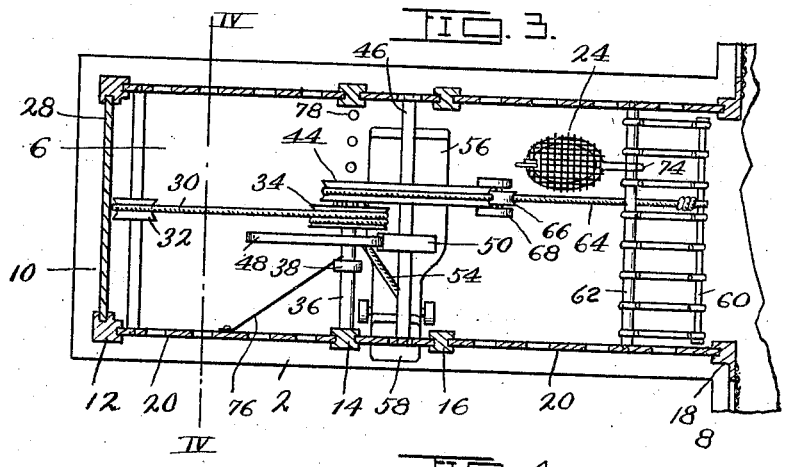
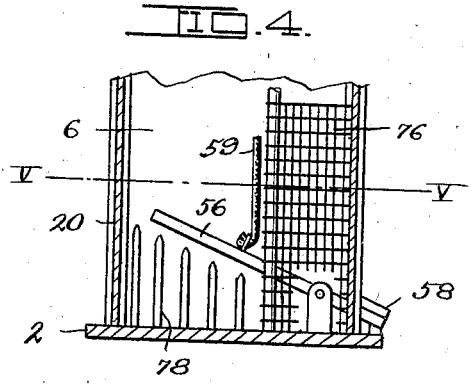
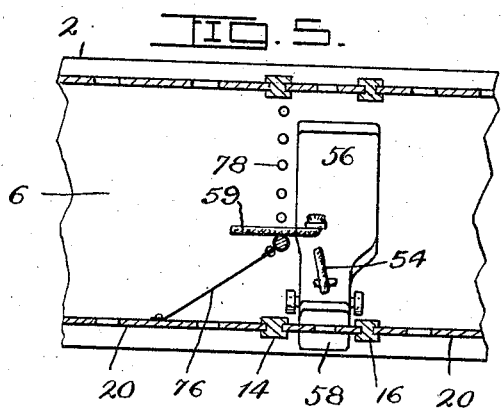
Inventor:
Lonnie S. Bender,
Witness:
Fred C. Fischer.
By F. G. Fischer,
Attorney Patented Oct. 16, 1923.

1,471,090

UNITED STATES PATENT OFFICE.

LONNIE S. BENDER, OF KANSAS CITY, MISSOURI.

ANIMAL TRAP.

Application filed January 19, 1923. Serial No. 613,594.

*To all whom it may concern:*

Be it known that I, LONNIE S. BENDER, a citizen of the United States, residing at Kansas City, in the county of Jackson and State of Missouri, have invented certain new and useful Improvements in Animal Traps, of which the following is a specification.

My invention relates to improvements in traps for catching animals, fowls, etc., and one object is to provide a trap of this character in which each animal or fowl on being trapped resets the trap for the entrance of the succeeding animal, thereby rendering it unnecessary for a person to give the trap attention until the entrapped animals or fowls are to be removed.

A further object is to provide a relatively simple trap which can be manufactured at a reasonable cost and is positive and reliable in operation.

Other objects will hereinafter appear, and in order that the invention may be fully understood, reference will now be had to the accompanying drawings, in which:

Fig. 1 is a perspective view of the trap.

Fig. 2 is an enlarged broken, vertical, longitudinal section of the forward portion of the trap.

Fig. 3 is a broken plan view of the forward portion of the trap with the hinged top removed to show the interior mechanism.

Fig. 4 is a fragmentary vertical cross section on line IV—IV of Fig. 3.

Fig. 5 is a fragmentary horizontal section on line V—V of Fig. 4.

In carrying out the invention, I employ a floor 2 upon which a cage 4 is mounted, consisting of a passageway 6 and a compartment 8.

The passageway 6 has an entrance 10 and consists of standards 12, 14, 16 and 18, slotted sheet metal panels 20 secured to said standards, and a hinged lid 22 to allow access to the bait holder 24 and other mechanism hereinafter described and located in said passageway 6.

The compartment 8 communicates with the rear portion of the passageway 6 and has a door 26 through which the entrapped animals or fowl may be removed.

The entrance 10 to the passageway 6 is controlled by a vertically slidable front door 28 mounted in the standards 12. The door is raised by a cable 30 running over a guide sheave 32 and wound upon a drum 34 fixed upon a shaft 36 journaled in the standard 14 and a standard 38.

The shaft 36 is provided with a fixedly-mounted pinion 40 intermeshing with a large internal gear wheel 42 formed integral with a large drum 44, fixedly mounted upon a shaft 46. The gears 40 and 42 are normally held from rotating and letting the gate 28 down, by means of a detent 48 loosely mounted upon the shaft 36, and a wheel 50 fixedly mounted upon the shaft 46 and provided with a notch 52, which is engaged by the upper end of the detent 48. The upper end of the detent 48 is normally held in the notch 52 by means of a cable 54 connected at its lower end to a trip lever 56 provided at one end with a counterweight 58 for normally holding said end downwardly. A cable 59 is connected at its ends to the lever 48 and the trip-lever 56, so that the latter when actuated may disengage the former from the notched portion 52 of the wheel 50.

60 designates a trap door leading from the rear of the passageway 6 into the compartment 8. Said trap door 60 is pivotally mounted at its upper end upon a transverse shaft 62 and connected at its lower end to the drum 44 by a cable 64 running between a pair of guide sheaves 66 mounted in bearings 68 secured upon the floor 2.

The bait holder 24 consists of a wire basket provided with a lid 70 having a snap fastener 72 to hold it in closed position, so that an animal entering the trap cannot remove the bait. The bait holder 24 is suspended from the shaft 62 by a hanger 74 above and at the rear of the trip lever 56, so that an animal or fowl must step thereon when attempting to reach the bait.

Animals and fowls are directed to the raised end of the trip lever 56 by a wing 76 in the passageway 6 and prevented from passing under said raised end by a guard consisting of pins 78, extending upwardly from the floor 2.

The operation is substantially as follows: As an animal passes into the entrance 10 to seek the bait in the holder 24, it is guided to the raised end of the trip lever 56 by the wing 76 and prevented from passing beneath said trip lever 56 by the pins 78. As the animal steps upon the raised end of the trip lever 56 it depresses the same against the action of the counterweight 58 and disengages the detent 48 from the notch 52 of the wheel 50, through the intermediacy of the cable 59. The front door 28 then drops by the force of gravity and shuts off the escape of the entrapped animal. As the compartment 8 is open to the light and the trap door 60 is of open wire mesh, the animal is attracted into said compartment 8 by the light. On entering the compartment 8 the animal raises the trap door 60 which automatically reopens the front door 28 through the intermediacy of the cable 64, the gear wheels 42 and 40, and the cable 30. As the door 28 reaches the end of its upward movement the notch 52 of the wheel 50 engages the detent 48 and prevents the front door 28 from closing when the trap door 60 swings downward to closed position. Owing to the proportions of the gears 40 and 42 and the drums 34 and 44, it will not be necessary to raise the trap door 60 very high to restore the front door 28 to open position and hence a small animal or fowl cannot enter the compartment 8 without resetting the trap.

From the foregoing description it will be understood that I have provided a trap embodying the advantages above pointed out, and while I have shown and described the preferred construction, combination and arrangement of parts, I reserve the right to make such changes as properly fall within the spirit and scope of the claims.

Having thus described my invention, what I claim and desire to secure by Letters Patent is:

1. In a trap, a cage, a self-closing door at the entrance to said cage, mechanism for normally holding said door in open position, an inclined trip lever which when depressed releases said mechanism so that the door may close, and a wing for directing an animal to the raised end of said trip lever.

2. In a trap, a cage, a self-closing door at the entrance to said cage, a drum, a cable connected to said drum and the door to hold the latter open, a wheel geared to the drum, a detent engaging said wheel to hold the same stationary, a trip lever, a cable connected to said trip lever and the detent to hold the latter in engagement with the wheel, and another cable connected to the lever and the detent to disengage the latter from the wheel so that the door may close.

3. A trap consisting of a passageway, a compartment into which said passageway leads, a self-closing door at the entrance to the passageway, a drum, a cable connected to said drum and the door to hold the latter open, a pinion fixed to rotate with the drum, a large internal gear and drum geared to said pinion, a wheel fixed to rotate with said internal gear and drum, a detent engaging said wheel to hold the same stationary, a trip lever operably connected to said detent to disengage the same from the wheel and permit the door to close, a self-closing door leading from the passageway into the compartment, and a cable connecting the internal gear drum and the last mentioned door whereby when the latter is opened opening of the first-mentioned door is effected.

4. A trap consisting of a passageway, a compartment into which said passageway leads, a self-closing door at the entrance to the passageway, a drum, a cable connected to said drum and the door to hold the latter open, a pinion fixed to rotate with the drum, a large internal gear and drum geared to said pinion, a wheel fixed to rotate with the internal gear and drum, a detent engaging said wheel to hold the same stationary, a trip lever weighted at one end and operably connected to said detent to disengage the same from the wheel and permit the door to close, a basket in the vicinity of the trip lever for holding bait, a self-closing door leading from the passageway into the compartment, and a cable connecting the internal gear and drum and the last mentioned door whereby when the latter is opened opening of the first-mentioned door is effected In testimony whereof I affix my signature, in the presence of two witnesses.

LONNIE S. BENDER.

Witnesses:
L. J. FISCHER,
F. C. FISCHER.